United States Patent [19]

Gotou et al.

[11] Patent Number: 5,694,912
[45] Date of Patent: Dec. 9, 1997

[54] FUEL INJECTION AMOUNT CONTROL APPARATUS FOR ENGINE

[75] Inventors: Atsushi Gotou, Toyota; Senji Kato, Aichi-ken, both of Japan

[73] Assignee: Toyota Jidosha Kabushiki Kaisha, Toyota, Japan

[21] Appl. No.: 704,166

[22] Filed: Aug. 28, 1996

[30] Foreign Application Priority Data

Aug. 29, 1995 [JP] Japan .................. 7-220604

[51] Int. Cl.$^6$ .................. F02D 41/14; F01L 1/34
[52] U.S. Cl. .................. 123/674; 123/90.17
[58] Field of Search .................. 123/90.15, 90.17, 123/674, 675

[56] References Cited

U.S. PATENT DOCUMENTS

| | | | |
|---|---|---|---|
| 4,726,344 | 2/1988 | Ando et al. | 123/674 |
| 4,844,041 | 7/1989 | Ave et al. | 123/674 |
| 4,850,326 | 7/1989 | Tomisawa | 123/675 |
| 5,024,199 | 6/1991 | Abe | 123/674 |
| 5,065,726 | 11/1991 | Klenk | 123/674 |
| 5,099,817 | 3/1992 | Nakaniwa | 123/674 |
| 5,243,951 | 9/1993 | Nakaniwa | 123/674 |
| 5,464,000 | 11/1995 | Pursifull et al. | 123/674 |
| 5,469,818 | 11/1995 | Yoshioka et al. | 123/90.17 |
| 5,494,008 | 2/1996 | Ohkawa et al. | 123/90.17 |
| 5,566,662 | 10/1996 | Messih | 123/674 |
| 5,626,109 | 5/1997 | Yasumura et al. | 123/90.17 |

FOREIGN PATENT DOCUMENTS

| | | |
|---|---|---|
| 4001494 | 8/1990 | Germany . |
| 64-19143 | 1/1989 | Japan . |
| 1-104938A | 4/1989 | Japan . |
| 3-3910A | 1/1991 | Japan . |

*Primary Examiner*—Willis R. Wolfe
*Attorney, Agent, or Firm*—Kenyon & Kenyon

[57] ABSTRACT

A fuel injection amount control apparatus for an engine comprises injectors for injecting fuel to an engine and an electronic control unit (ECU) for controlling the injectors. The ECU learns the deviation between the air-fuel ratio of a flammable mixture to be supplied to the engine and the target value. The ECU controls the amount of fuel injection to the engine by reflecting the learning value on the computation of the injection amount. The engine has intake valves, exhaust valves and an apparatus for altering the open/close characteristics of the intake valves. The ECU computes the learning value of the air-fuel ratio in accordance with the behavior of the characteristic altering apparatus and the running conditions of the engine. When the coolant temperature of the engine is low and the learning value is not renewed, the ECU compensates the already updated learning value to a smaller value. The ECU performs this compensation based on the ratio of the real valve characteristic to the valve characteristic for the engine in a fully warmed-up state.

21 Claims, 10 Drawing Sheets

FUEL INJECTION AMOUNT CONTROL APPARATUS FOR ENGINE

BACKGROUND OF THE INVENTION

1. Field of the Invention

The present invention relates generally to a fuel injection amount control apparatus for an engine, which learns the difference between the air-fuel ratio of a combustible fuel mixture to be supplied to the engine and a target value and reflects the learned value in the computation of the amount of fuel injection to thereby control the amount of fuel injection. More particularly, this invention relates to a fuel injection amount control apparatus in an engine, which is adapted for use for an engine having an apparatus for changing the actuating characteristics of an intake valve and an exhaust valve and performs learning control of the air-fuel ratio based on the actuating characteristics of the valve and the running conditions of the engine.

2. Description of the Related Art

Conventionally, an injector provided in an engine injects fuel to be supplied to combustion chambers. There are control apparatuses equipped with a computer for controlling the amount of fuel injection from the injector in accordance with the running conditions of an engine. An apparatus of this type causes the computer to control the amount of fuel injection to adjust the air-fuel ratio of a mixture of air and fuel to be supplied to combustion chambers.

Japanese Unexamined Patent Publication No. Hei 1-104938 discloses an example of such an apparatus. In this apparatus, the computer computes the difference between the actual air-fuel ratio and a preset target value. In accordance with the computed difference, the computer adjusts the fuel injection amount to execute feedback control of the air-fuel ratio so that the actual air-fuel ratio approximates the target value. In controlling the fuel injection amount, the computer computes each deviation of the actual air-fuel ratio as a learning value in association with the load of the engine (manifold pressure in the manifold). The computer performs such control as to reflect the learning value in the control of the fuel injection amount, that is, learning control.

The computer executes learning control of the air-fuel ratio to improve the emissions of the engine. Generally, the deviation of the air-fuel ratio differs according to various running conditions of an engine. The computer computes the difference between individual deviations as a learning value and reflects the learning value on the control of the fuel injection amount to improve the controllability of the air-fuel ratio. In executing the learning control, it is necessary to consider the most dominant factor of the engine, i.e., the parameter by which the difference between engines directly affects the air-fuel ratio. The learning control should be executed based on logic to cancel the parameter-oriented deviation. Therefore, the conventional apparatuses, including the one disclosed in the aforementioned Japanese patent publication, previously divide the variable range of the engine load (manifold pressure) into a plurality of sub ranges. The learning control is executed based on learning values, which are computed for the individual sub ranges.

Some apparatuses are designed to change the engine valve characteristics such as the open/close timing (valve timing) or open/close amount (maximum lift amount) of the intake valve or the exhaust valve or both. Suppose the apparatus disclosed in the Japanese patent publication is adapted for use in an engine that is equipped with such a characteristic changing apparatus. In this case also, one may consider the reflection of the learning value of the air-fuel ratio, computed in association with the engine load (manifold pressure), on the control of the fuel injection amount in accordance with the running conditions of the engine and the amount of the change in valve characteristics.

If the apparatus disclosed in the Japanese patent publication is used in an engine equipped with the characteristic changing apparatus, however, the following problem may arise. The target value of the valve timing to be changed by the characteristic changing apparatus generally differs between a cold engine and a warm engine. In the cold state, the target value is so compensated as not to shift in the direction of the advance angle so much. The learning value of the air-fuel ratio is updated only after the engine is warmed up (when the coolant temperature of the engine becomes equal to or higher than a predetermined value).

Suppose that the valve timing has been changed by a predetermined amount after the engine warmed-up and that the learning value of the air-fuel ratio has been renewed. If the valve timing has not changed at all thereafter, the previously renewed learning value is directly reflected in the control of the fuel injection amount. In this case, however, there is no influence of the operation of the characteristic changing apparatus, so that the updated learning value is directly reflected in the control of the fuel injection amount. Accordingly, the fuel injection amount may be erroneously compensated so that the desired fuel injection amount cannot be acquired. This may decrease the precision of the control of the fuel injection amount.

SUMMARY OF THE INVENTION

Accordingly, it is a primary objective of the present invention to provide a fuel injection amount control apparatus for an engine, which is adapted for use in an engine having an apparatus for changing the actuating characteristics of an intake valve and an exhaust valve, and which performs learning control of the air-fuel ratio based on the actuating characteristics of the valve and the running conditions of the engine, and which can improve the precision of the control of the fuel injection amount.

To achieve the foregoing and other objects and in accordance with the purpose of the present invention, a fuel injection amount control apparatus for an engine is provided. The engine has a fuel injecting means for injecting fuel supplied to a combustion chamber, an air intake passage for introducing air to the combustion chamber, an exhaust passage for exhausting gas from the combustion chamber, an intake valve for selectively opening and closing the air intake passage, an exhaust valve for selectively opening and closing the exhaust passage and a valve adjusting means for adjusting an actuating characteristic of at least one of the intake valve and the exhaust valve. The adjusting means is controlled by a first control means. The apparatus has a detecting means for detecting a running condition of the engine, a computing means for computing a target value representing the fuel injection amount injected by the fuel injecting means based on the detected running condition, a second control means for controlling the fuel injecting means based on the computed target value, learning means for learning a value representing an air-fuel ratio of a combustible fuel mixture based on the adjusted actuating characteristic and the detected running condition, a reflecting means for reflecting the learning value in computing the target fuel injection amount, a renewing means for renewing the learning value when the detected running condition is in a specific condition. The first control means controls the adjusting means based on the detected running condition. The apparatus includes compensating means for compensating the reflected learning value when the detected running condition is out of the specific condition.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A fuel injection amount control apparatus for an engine according to the first embodiment of the present invention as adapted for use in a gasoline engine will be now described in detail referring to the accompanying drawings.

Figure 1:
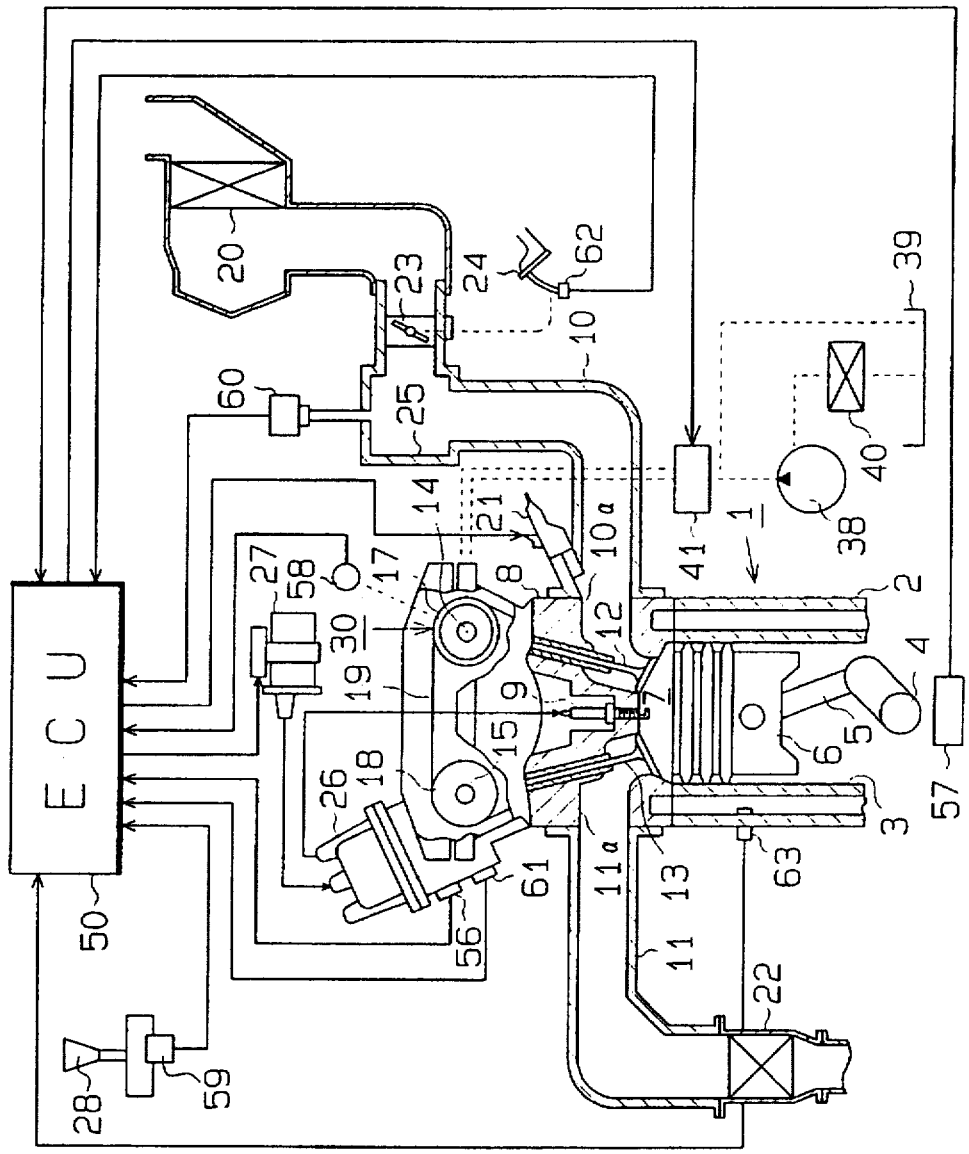
FIG. 1 is a schematic structural diagram showing a fuel injection amount control apparatus for an engine according to the first embodiment of this invention.

FIG. 1 presents a schematic structural diagram showing a gasoline engine 1 and a fuel injection amount control apparatus for the engine 1. A cylinder block 2 of the engine 1 has a plurality of cylinder bores 3. A coolant temperature sensor 63 provided in the block 2 detects the temperature THW of the coolant that flows through a water jacket in the block 2. Pistons 6 placed in the respective cylinder bores 3 are coupled with a connecting rod 5 to a crankshaft 4. A cylinder head 8 fixed to the top of the block 2 covers the individual bores 3 in which spaces defined by the head 8 and the associated pistons 6 form combustion chambers 7. Ignition plugs 9 are provided in the respective combustion chambers 7. An air-intake passage 10 is connected to intake ports 10a which communicate with the respective combustion chambers 7. An exhaust passage 11 is connected to exhaust ports 11a which communicate with the respective combustion chambers 7.

A plurality of intake valves 12 provided at the cylinder head 8 selectively open or close the associated intake ports 10a. A plurality of exhaust valves 13 provided at the cylinder head 8 selectively open or close the associated exhaust ports 11a. An intake-side cam shaft 14 and an exhaust-side cam shaft 15, both rotatably provided at the head 8, both have a plurality of cams (not shown) to actuate the individual intake valves 12 and the individual exhaust valves 13. As the cam shaft 14 rotates, the intake valves 12 are selectively opened or closed. As the cam shaft 15 rotates, the exhaust valves 13 are selectively opened or closed. An intake-side timing pulley 17 and an exhaust-side timing pulley 18, respectively provided at the distal ends of the cam shafts 14 and 15, are coupled to the crankshaft 4 by a timing belt 19.

When the engine 1 runs, the torque of the crankshaft 4 is transmitted by the timing belt 19 and the timing pulleys 17 and 18 to the cam shafts 14 and 15 to selectively open or close the valves 12 and 13. Those valves 12 and 13 are selectively opened or closed at given timings in synchronism with the rotation of the crankshaft 4 or in synchronism with a series of four strokes including the suction stroke, the compression stroke, the combustion and expansion stroke, and the exhaust stroke of the engine 1.

An air cleaner 20 provided at the inlet side of the air-intake passage 10 cleans the outside air taken into the passage 10. Injectors 21 provided near the respective intake ports 10a inject fuel supplied under pressure from a fuel supplying apparatus (not shown). When the engine 1 runs, the air is led via the air cleaner 20 into the air-intake passage 10. As the fuel injected from each injector 21 is injected at the same time as the air intake takes place, the mixture of the air and fuel is led into the associated combustion chamber 7 when the associated intake valve 12 is opened in the suction stroke of the engine 1.

The air-fuel mixture supplied into each combustion chamber 7 is ignited and burned by the associated ignition plug 9. As a result, the piston 6 and rod 5 are actuated to rotate the crankshaft 4, providing the engine 1 with the driving power. The exhaust gas after combustion is discharged out of the combustion chamber 7 via the associated exhaust port 11a and the exhaust passage 11 in synchronism with the opening of the associated the exhaust valve 13 in the exhaust stroke of the engine 1.

A catalytic converter 22, provided in the exhaust passage 11, cleans the exhaust gas with an incorporated catalytic converter rhodium.

A throttle valve 23 provided in the air-intake passage 10 functions in response to the manipulation of an acceleration pedal 24. The intake air amount in the air-intake passage 10 can be controlled by adjusting the opening of the valve 23. An idle switch 62 provided at the acceleration pedal 24 outputs an idle signal IDL when the pedal 24 is not manipulated or when the valve 23 is fully closed. A surge tank 25 provided in the air-intake passage 10 at the downstream of the throttle valve 23 smoothes the pulsation of the introduced air. A manifold pressure sensor 60 provided in the surge tank 25 detects the manifold pressure PM correlated to the load of the engine 1.

An igniter 27 is connected to the associated ignition plug 9 via a distributor 26. The igniter 27 transmits a high voltage which is applied by the distributor 26 to the associated ignition plug 9 in synchronism with a change in the rotational angle of the crankshaft 4 (crank angle CA). The ignition timing of each ignition plug 9 is determined by the timing at which the high voltage is transmitted from the igniter 27.

The distributor 26 incorporates a rotor (not shown), which is coupled to the exhaust-side cam shaft 15 and rotates in synchronism with the rotation of the crankshaft 4. An engine speed sensor 61 provided in the distributor 26 detects the rotational speed of the crankshaft 4 or the engine speed NE. An engine timing sensor 56 provided in the distributor 26 detects the reference position of the rotational phase of the crankshaft 4 at a predetermined rate in accordance with the rotation of the rotor. A crank angle sensor 57 provided near the crankshaft 4 detects the rotational angle of the crankshaft 4 based on the timing for detecting the reference position detected by the engine timing sensor 56. A cam sensor 58 provided near the intake-side cam shaft 14 detects the rotational angle of the crankshaft 14 or the cam angle VT. A shift lever 28 is manipulated to alter the setting of the gear ratio of an automatic transmission system (not shown) provided in the engine 1. A shift position sensor 59 provided at the shift lever 28 detects the shifted position SP of the shift lever 28.

A variable valve timing mechanism (VVT) 30 disposed between the intake-side cam shaft 14 and the timing pulley 17 changes the open/close timing of each intake valve 12 (valve timing). The VVT 30 and the peripheral structure will be discussed below.

Figure 2:
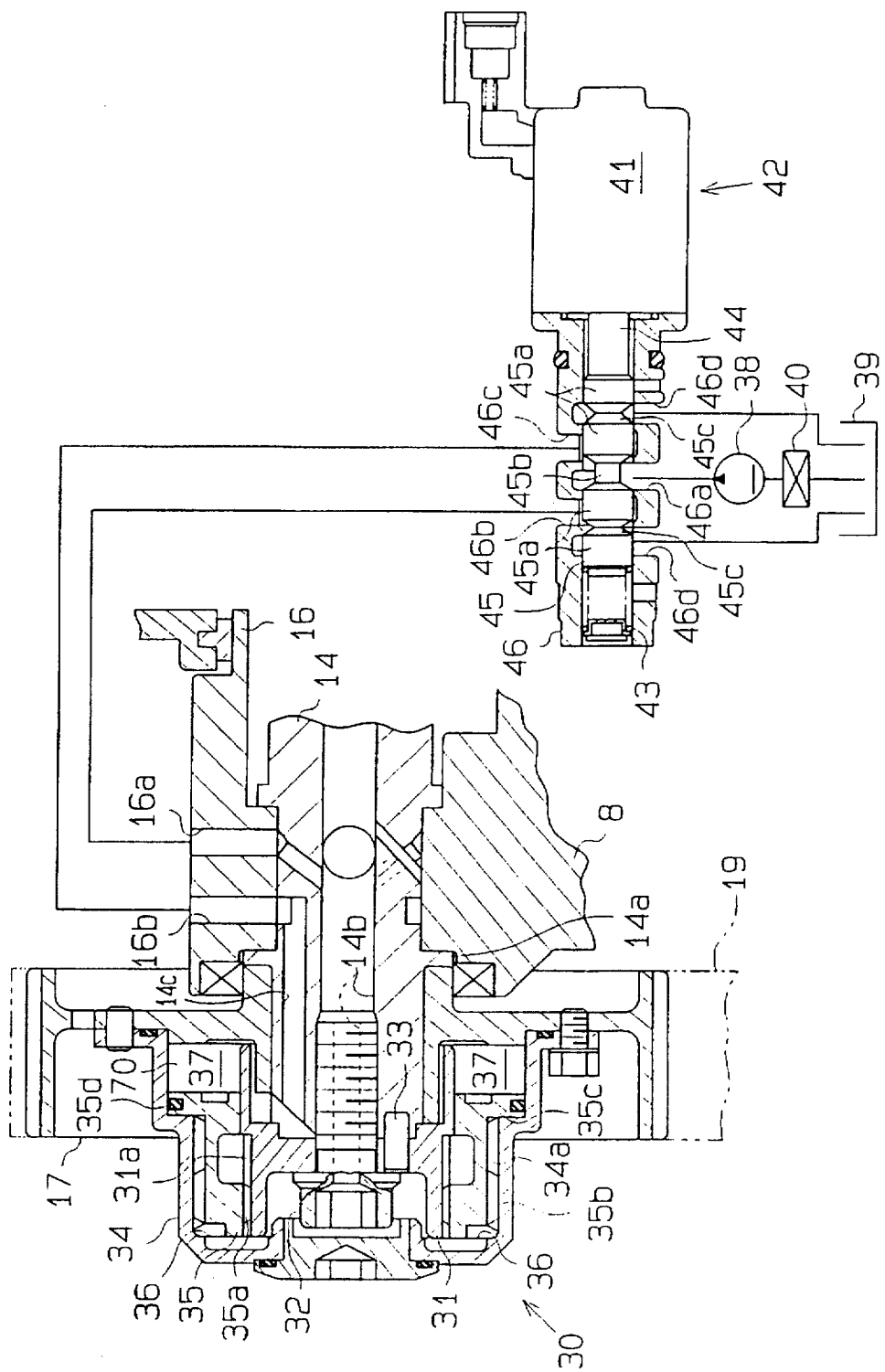
FIG. 2 is a schematic cross-sectional view showing the structures of a variable valve timing mechanism (VVT) and an oil control valve (OCV)

As shown in FIG. 2, the cam shaft 14 is rotatably supported by the bearing of the cylinder head 8 and a bearing cap 16. A cylindrical sleeve 31 provided at the distal end of the cam shaft 14 is secured to the shaft 14 by a hollow bolt 32 and a pin 33. The sleeve 31 has a helical spline 31a on the outer surface.

The timing pulley 17 is provided on the outer surface of the front portion of the cam shaft 14 and is located between the flange portion 14a, of the cam shaft 14 and the sleeve 31. A housing 34 is attached to the front side of the timing pulley 17 so as to cover the distal end of the cam shaft 14. The inner wall of the housing 34 and the front surface of the pulley 17 form annular space 70. The housing 34 has a helical spline 34a on the inner surface.

A ring gear 35 disposed in the annular space 70 is movable along the axial direction of the cam shaft 14. That is, the cylindrical ring gear 35 has an inner helical spline 35a and an outer spline 35b on the inner and outer surfaces, respectively. The ring gear 35 is located between the sleeve 31 and the housing 34 in such a way that the inner helical spline 35a engages with the helical spline 31a of the sleeve 31 and the outer helical spline 35b engages with the helical spline 34a of the housing 34. The torque of the crankshaft 4 transmitted to the pulley 17 is transmitted to the cam shaft 14 by the ring gear 35 and the sleeve 31.

A flange 35c provided on the ring gear 35 separates the annular space 70 into two spaces. A packing 35d provided on the outer surface of the flange 35c seals the two divided spaces. The front space (left-side space in FIG. 2) of the flange 35c constitutes a first compression chamber 36, and the rear space (right-side space in FIG. 2) constitutes a second compression chamber 37.

The bearing cap 16 has first and second oil holes 16a and 16b. The cam shaft 14 has internal first and second oil passages 14b and 14c. The first oil passage 14b allows the first oil hole 16a to communicate with the first compression chamber 36 through the hole of the hollow bolt 32. The second oil passage 14c allows the second oil hole 16b to communicate with the second compression chamber 37.

An oil pump 38, an oil pan 39 and an oil filter 40 serve as the lubrication apparatus for the engine 1. The first and second oil holes 16a and 16b are connected to the oil pump 38, oil pan 39 and oil filter 40 via a solenoid-control type oil control valve (OCV) 41. The OCV 41 has a plunger 44, which is actuated by a solenoid actuator 42 and a coil spring 43. As this plunger 44 causes a spool 45 to reciprocate in the axial direction to thereby switch the flowing direction of the lubrication oil, which serves as the hydraulic fluid. The duty-ratio based control of the actuator 42 performed to adjust the openings of ports will be discussed later. As a result, the pressures of oil to be supplied to the individual compression chambers 36 and 37 are adjusted.

The OCV 41 has a casing 46 which has a first port 46a, a second port 46b, a third port 46c and a fourth port 46d. The first port 46a is connected via the oil pump 38 to the oil pan 39. The second port 46b is connected to the first oil hole 16a. The third port 46c is connected to the second oil hole 16b. The fourth port 46d is connected to the oil pan 39.

The spool 45 is a cylindrical valve body which has four lands 45a and passages 45b and 45c. The four lands 45a block the flow of the hydraulic fluid between the second and third ports 46b and 46c. The passage 45b causes the two ports 46b and 46c to communicate with each other to permit the flow of the hydraulic fluid therebetween. The passages 45c are located to the sides of the center passage 45b, as illustrated in FIG. 2.

With the above-described structure, when the actuator 42 is excited with the maximum current (duty ratio=100%) to move the spool 45 leftward in FIG. 2 against the force of the spring 43, the center passage 45b allows the first port 46a to communicate with the second port 46b to supply the hydraulic fluid to the first oil hole 16a. The hydraulic fluid supplied to the first oil hole 16a is supplied via the first oil passage 14b to the first compression chamber 36, so that oil pressure is applied to the distal end of the ring gear 35. At this time, the amount of connection between the first oil hole 16a and the first port 46a becomes maximum (100%).

At the same time, the right passage 45c in FIG. 2 allows the third port 46c to communicate with the fourth port 46d so that the hydraulic fluid in the second compression chamber 37 is discharged into the oil pan 39 via the second oil passage 14c, the second oil hole 16b and the third port 46c of the OCV 41. At this time, the amount of connection between the second oil hole 16b and the fourth port 46d becomes maximum (100%).

Accordingly, the ring gear 35 is moved rearward (rightward in FIG. 2) at the maximum speed while rotating by the oil pressure applied to its distal end. Therefore, twisting force is applied to the cam shaft 14 by the sleeve 31. As a result, the rotational phase of the cam shaft 14 with respect to the timing pulley 17 (crankshaft 4) is changed toward the maximum advance angle from the maximum retard angle, so that the close timing for the intake valves 12 is advanced. The ring gear 35, when abutting on the timing pulley 17, is restricted from moving further. With the ring gear 35 shifted to this abutting position, the open timing for the intake valves 12 becomes most advanced.

When the actuator 42 is de-excited (duty ratio=0%), the spool 45 is moved rightward in FIG. 2 by the force of the spring 43. At this time, the center passage 45b connects the first port 46a to the third port 46c to supply the hydraulic fluid to the second oil hole 16b. The hydraulic fluid supplied to the second oil hole 16b is supplied via the second oil passage 14c to the second compression chamber 37, so that oil pressure is applied to the rear end of the ring gear 35. At this time, the amount of connection between the second oil hole 16b and the first port 46a becomes maximum (100%).

At the same time, the left passage 45c in FIG. 2 connects the second port 46b to the fourth port 46d so that the hydraulic fluid in the second compression chamber 36 is discharged into the oil pan 39 via the first oil passage 14b, the first oil hole 16a, the second port 46b and the fourth port 46d. At this time, the amount of connection between the first oil hole 16a and the fourth port 46d becomes maximum (100%).

The ring gear 35 is moved frontward (leftward in FIG. 2) at the maximum speed while rotating by the oil pressure applied to its rear end, thus applying reverse twisting force to the cam shaft 14 by the sleeve 31. As a result, the rotational phase of the cam shaft 14 with respect to the timing pulley 17 (crankshaft 4) is changed toward the maximum retard angle from the maximum advance angle so that the open timing for the intake valves 12 is delayed. The further movement of the ring gear 35, when abutting on the timing pulley 17, is restricted. With the ring gear 35 shifted to this abutting position (the position of the maximum retard angle), the open timing for the intake valves 12 is delayed most.

By altering the duty ratio for controlling the actuator 42 between 0% and 100%, the moving stroke of the ring gear 35 is changed. Therefore, the amounts of connection of the first and second oil holes 16a and 16b to the first port 46a and the amounts of connection of the first and second oil holes 16a and 16b to the fourth port 46d are altered between 0% and 100%, changing the moving speed of the ring gear 35.

As the actuator 42 is controlled to have a predetermined duty ratio (holding duty value), the spool 45 is moved to the position to close the second port 46b and the third port 46c by the lands 45a. Therefore, the amounts of connection of the first and second oil holes 16a and 16b to the first port 46a and the amounts of connection of the first and second oil holes 16a and 16b to the fourth port 46d become 0%. Consequently, the ring gear 35 is shifted toward neither the advance angle side nor the retard angle side (the moving speed becomes zero), and is held at the current position.

Figure 3:
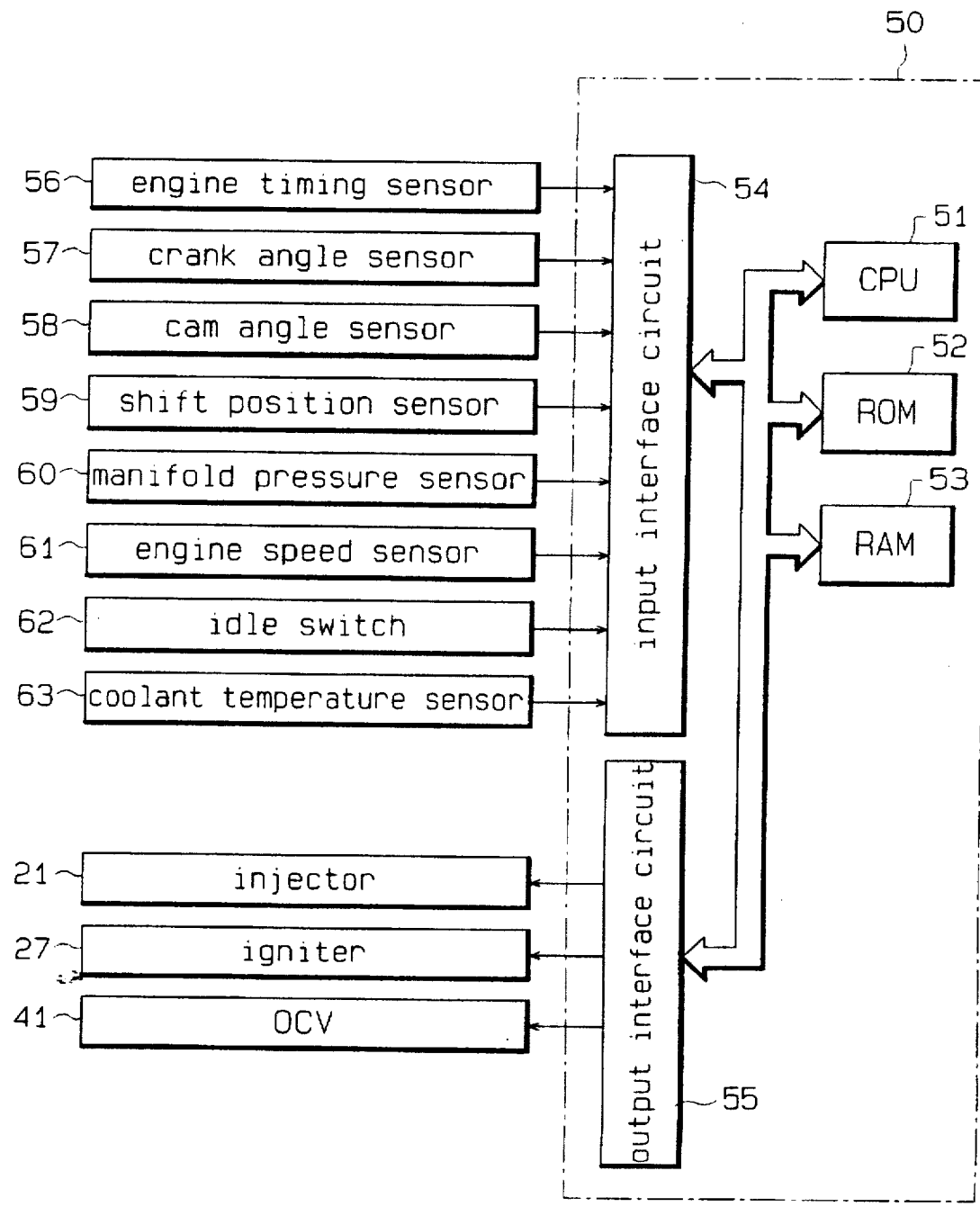
FIG. 3 is a block circuit diagram illustrating the electric structure of an electronic control unit (ECU)

As shown in FIG. 3, an electronic control unit (ECU) 50, which controls the engine 1, comprises a central processing unit (CPU) 51, a read only memory (ROM) 52, a random access memory (RAM) 53, an input interface circuit 54 and an output interface circuit 55. Various kinds of control programs are previously stored in the ROM 52. The RAM 53 temporarily stores various kinds of data.

The engine timing sensor 56, the crank angle sensor 57, the cam sensor 58, the shift position sensor 59, the manifold pressure sensor 60, the engine speed sensor 61, the idle switch 62 and the coolant temperature sensor 63 are connected with the input interface circuit 54 to the CPU 51. The OCV 41 (actuator 42), the injectors 21 and the igniter 27 are connected via the sent interface circuit 55 to the CPU 51. The CPU 51 controls the OCV 41, the injectors 21 and the igniter 27 based on the signals output from the individual sensors 56–63 in accordance with control programs stored in the ROM 52. Accordingly, the valve timing control, fuel injection amount control, fuel injection timing control and ignition timing control are executed.

Figure 4:
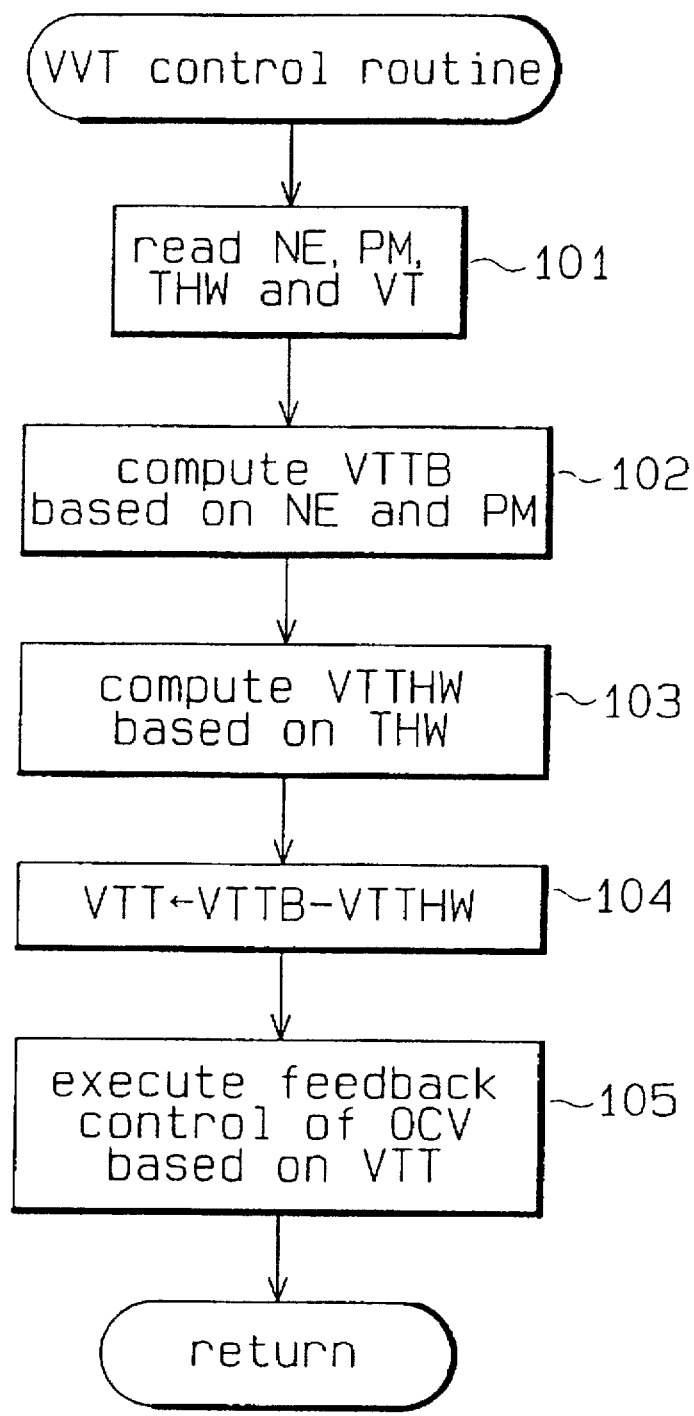
FIG. 4 is a flowchart illustrating a VVT control routine.

Now, the programs for executing the aforementioned various controls will be described. FIG. 4 presents a flowchart illustrating a "VVT control routine" which controls the duty ratio of the OCV 41 to thereby control the VVT 30. The ECU 50 executes this routine at predetermined times.

When the process enters this control routine, the ECU 50 reads the values of the engine speed NE, the manifold pressure PM, the coolant temperature THW and the cam angle VT based on the detection signals from the engine speed sensor 61, the manifold pressure sensor 60, the coolant temperature sensor 63 and the cam sensor 58 in step 101.

Figure 5:
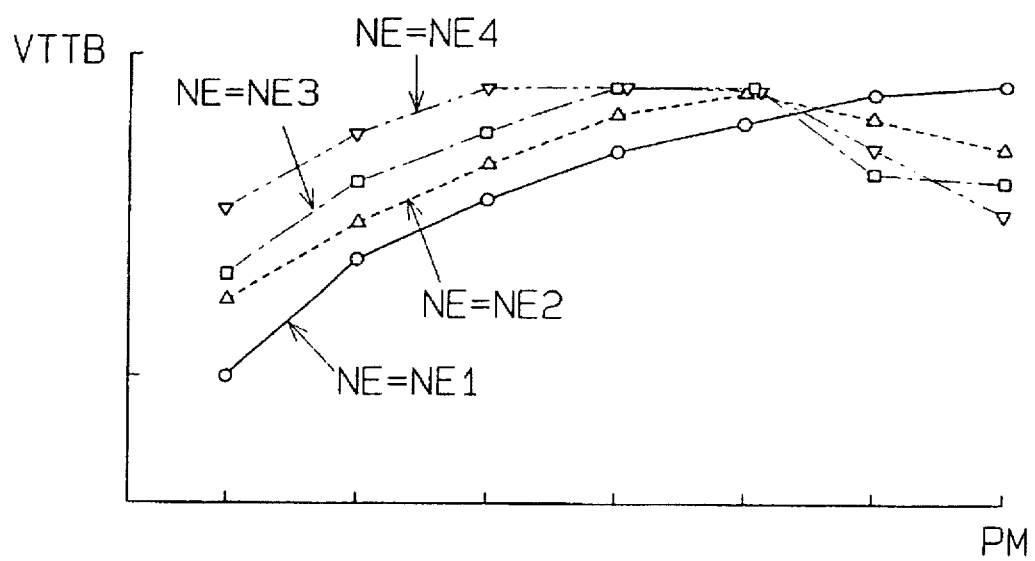
FIG. 5 is a graph showing function data having the manifold pressure (PM), engine speed (NE) and basic timing (VTTB) as parameters.

In step 102, the ECU 50 computes the value of a basic timing VTTB based on the currently read values of the engine speed NE and manifold pressure PM. The basic timing VTTB is the target value in the case where the engine 1 is fully warmed up. In computing this basic timing VTTB, the ECU 50 refers to function data as shown in FIG. 5. This function data is previously determined based on the manifold pressure PM, the engine speed NE and the basic timing VTTB as parameters. In the function data, the basic timing VTTB is set to the minimum value beyond which a misfire would occur, when the manifold pressure PM (engine load) is low or about the middle. This setting increases the internal EGR amount (Exhaust Gas Return amount with respect to the combustion chamber 7) in the engine 1 and decreases the pumping loss, which results in improved fuel mileage.

Under the aforementioned partially loaded condition, when the engine speed NE is low (NE=NE1), the valve overlap between the intake valves 12 and the exhaust valves 13 tends to become smaller as compared with the case where the engine speed NE is high (NE=NE4). Therefore, the basic timing VTTB is set to a small value. When the manifold pressure PM is high (full load), the output torque of the engine 1 should be increased as much as possible. Therefore, the basic timing VTTB is so set as to give priority to the close timing of the intake valves 12.

Figure 6:
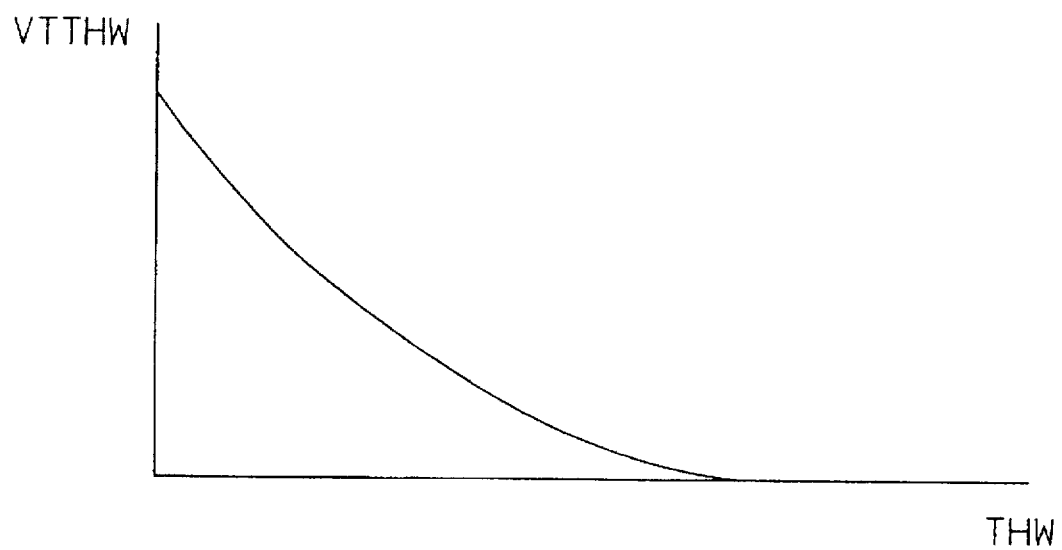
FIG. 6 is a graph showing function data having the coolant temperature (THW) and water temperature correction amount (VTTHW) as parameters.

In step 103, the ECU 50 computes the value of a water temperature correction amount VTTHW based on the currently read value of the coolant temperature THW. In computing this water correction amount VTTHW, the ECU 50 refers to function data as shown in FIG. 6. This function data is previously determined based on the coolant temperature THW and water temperature correction amount VTTHW as parameters. When the coolant temperature THW is high, the target change angle VTT should be directly set to the basic timing VTTB. When the coolant temperature THW is low, on the other hand, the valve overlap amount should be reduced to ensure combustion. The water temperature correction amount VTTHW in this function data is set so as to reduce the target change angle VTT.

In step 104, the ECU 50 sets the value of the target change angle VTT based on the currently computed values of the basic timing VTTB and the water temperature correction amount VTTHW. More specifically, the value of the water correction amount VTTHW is subtracted from the value of the basic timing VTTB and the subtraction result is set as the value of the target change angle VTT.

In step 105, the ECU 50 performs feedback control of the OCV 41 based on the currently computed value of the target change angle VTT. In other words, the ECU 50 controls the OCV 41 in such a manner that the value of the actual change angle (cam angle VT) matches with the value of the target change angle VTT. After executing the process in step 105, the ECU 50 temporarily terminates the subsequent processing.

In the above-discussed control routine, the value of the target change angle VTT is set based on the running conditions of the engine 1, which may vary from time to time. In addition, the feedback control of the OCV 41 is performed on the basis of the value of the target change angle VTT to properly control the valve timing associated with the intake valves 12.

Figure 7:
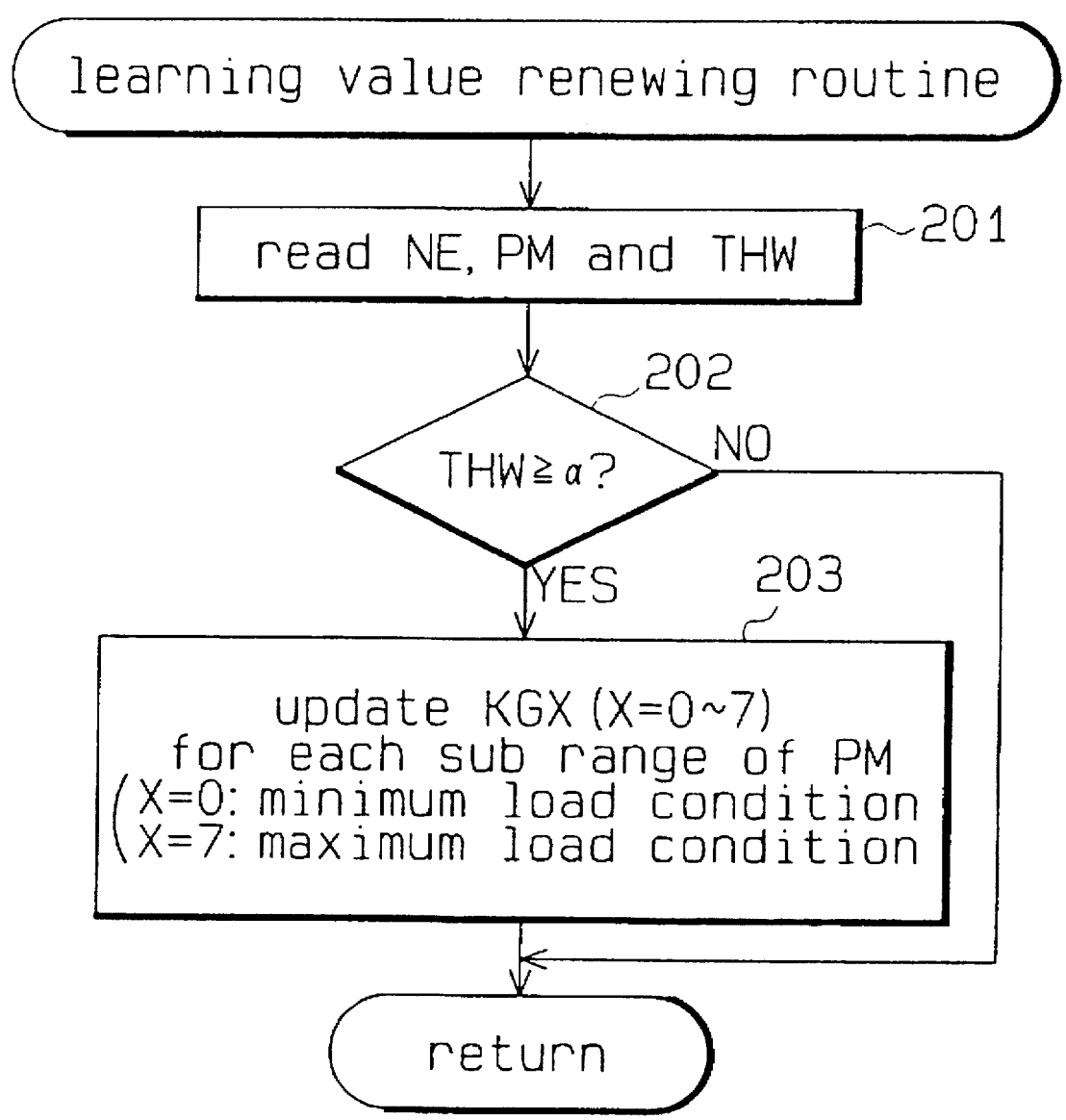
FIG. 7 is a flowchart illustrating a learning value renewing routine.

A description will be now given of a process for the renewal of a learning value KGX which is executed by the ECU 50 under a predetermined condition during control of the fuel injection amount. FIG. 7 presents a flowchart illustrating a "learning value renewing routine" which is periodically executed by the ECU 50 at predetermined times.

When the process enters this control routine, the ECU 50 reads the values of the engine speed NE, the manifold pressure PM and the coolant temperature THW based on the detection signals from the engine speed sensor 61, the manifold pressure sensor 60 and the coolant temperature sensor 63 in step 201.

In step 202, the ECU 50 determines if the currently read coolant temperature THW is equal to or greater than a predetermined value $\alpha$ (for example, $\alpha=80°$ C.). When the coolant temperature THW is less than the predetermined value $\alpha$, which means that the condition for renewing the learning value KGX is not met, the ECU 50 temporarily terminates the subsequent processing.

When the coolant temperature THW is equal to or greater than the predetermined value $\alpha$ in step 202, the ECU 50 updates the learning value KGX in association with the currently read value of the manifold pressure PM in step 203. More specifically, the changeable range of the manifold pressure PM detected by the manifold pressure sensor 60 is previously divided into, for example, seven sub ranges. The ECU 50 computes the learning value KGX associated with the manifold pressure PM for each sub range detected from time to time, and sets that value as a new learning value KGX. When the current manifold pressure PM corresponds to the minimum load condition, for example, the ECU 50 computes "KG0" as the learning value KGX and sets it as a new learning value KGX. When the current manifold pressure PM corresponds to the maximum load condition, the ECU 50 computes "KG7" as the learning value KGX and sets it as a new learning value KGX. In this embodiment, the middle value for the learning values KGX is set to, for example, "1.0". Any scheme including the addition or subtraction of a predetermined value to or from the previous learning value KGX may be employed as a method of renewing the learning value KGX. After executing the process in step 203, the ECU 50 temporarily terminates the subsequent processing.

In this renewing routine, the learning value KGX associated with the manifold pressure PM is renewed only when the coolant temperature THW becomes equal to or greater than the predetermined value $\alpha$, that is, when the engine 1 is determined to have been fully warmed up.

Figure 8:
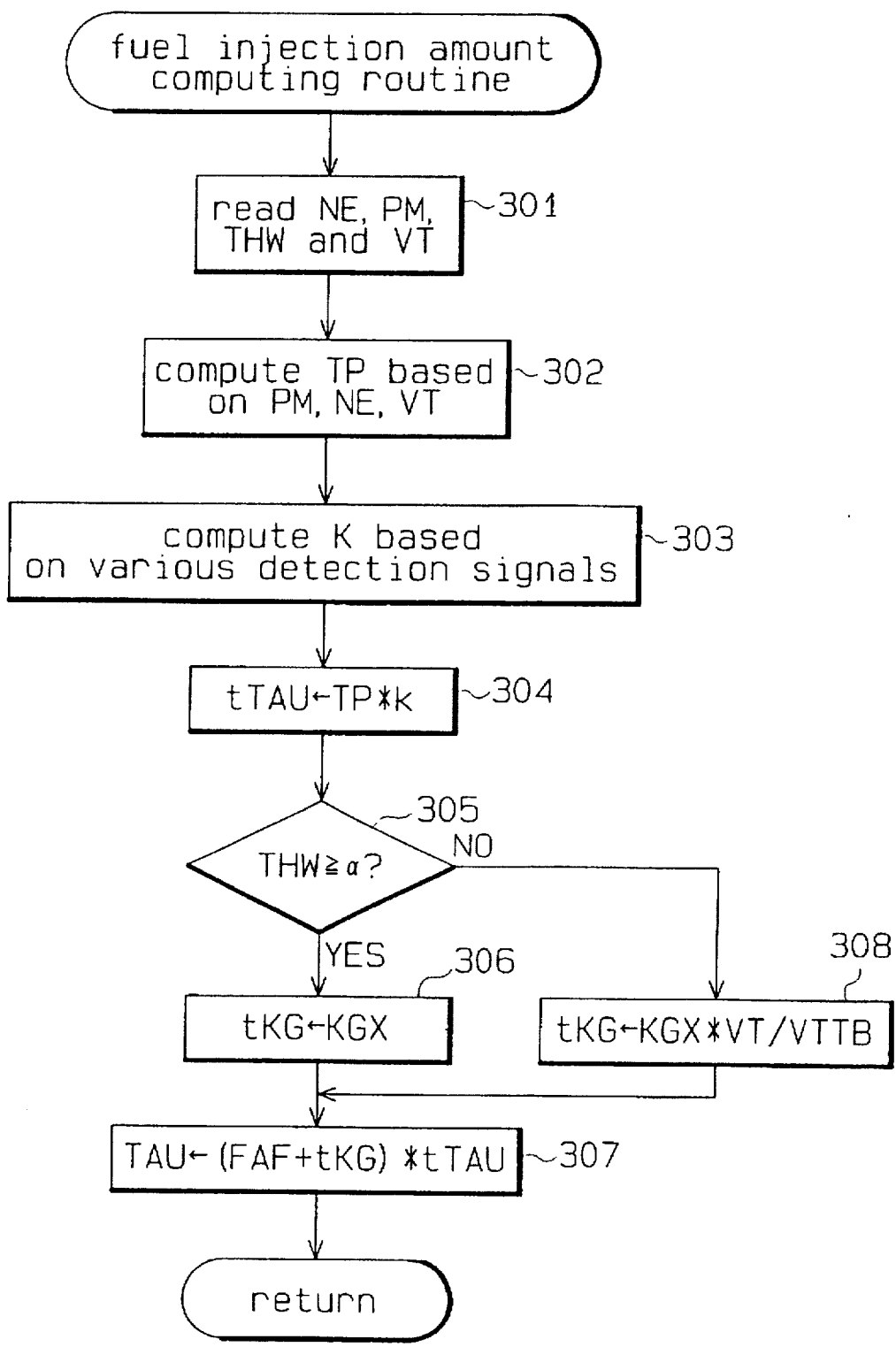
FIG. 8 is a flowchart illustrating a fuel injection amount computing routine.

Next, a description will be given of the fuel injection amount control, which is executed by the ECU 50 based on the learning value KGX, etc. FIG. 8 presents a flowchart illustrating a "fuel injection amount computing routine" which is periodically by the ECU 50 at predetermined times.

When the process enters this control routine, the ECU 50 reads the values of the engine speed NE, the manifold pressure PM, the coolant temperature THW and the cam angle VT based on the detection signals from the engine speed sensor 61, the manifold pressure sensor 60, the coolant temperature sensor 63 and the cam sensor 58 in step 301.

In step 302, the ECU 50 computes the value of a basic injection amount TP based on the currently read values of the manifold pressure PM, the engine speed NE and the cam angle VT. In computing this basic injection amount TP, the ECU 50 refers to function data, which is previously determined, based on the manifold pressure PM, the engine speed NE and the cam angle VT as parameters.

In step 303, the ECU 50 computes a compensation coefficient k based on various detection signals indicating various running conditions other then besides the manifold pressure PM and the engine speed NE. This compensation coefficient k includes various compensation terms at the start time, the acceleration time, the deceleration time, etc.

In step 304, the ECU 50 multiplies the currently computed basic injection amount TP by the compensation coefficient k to calculate the tentative injection amount tTAU at the time before the reflection of the learning value KGX.

In step 305, the ECU 50 determines if the currently read coolant temperature THW is equal to or greater than the predetermined value $\alpha$. When the coolant temperature THW is equal to or greater than the predetermined value $\alpha$, which means that the engine 1 has fully been warmed up and the condition for renewing the learning value KGX is met, the ECU 50 proceeds to step 306.

In step 306, the ECU 50 directly sets the learning value KGX currently renewed in the "learning value renewing routine" as a reflective learning value tKG.

In step 307, the ECU 50 computes the target fuel injection amount TAU using the currently set reflective learning value tKG. More specifically, the ECU 50 adds the currently computed reflective learning value tKG to a feedback compensation coefficient FAF (for example, the reference value is "0" in this embodiment) computed in another routine. The ECU 50 multiplies the addition result by the currently computed injection amount tTAU to compute the target fuel injection amount TAU. After completing the process in step 307, the ECU 50 temporarily terminates the subsequent processing.

When the coolant temperature THW is less than the predetermined value $\alpha$ in step 305, the ECU 50 determines that the current state is the cold state and no renewal of the learning value KGX is being executed, and it proceeds to step 308.

In step 308, the ECU 50 computes the reflective learning value tKG for compensating the learning value KGX currently updated in the "learning value renewing routine" as follows. The ECU 50 multiplies the already updated learning value KGX by the ratio of the current cam angle VT to the basic timing VTTB (see step 102) that has been computed in the "VVT control routine" and sets the multiplication result as the reflective learning value tKG. Consequently, the computed reflective learning value tKG is compensated to become a relatively small value smaller than the value in the state where the engine 1 is fully warmed up.

Thereafter, the ECU 50 executes the process in step 307 after which the ECU 50 temporarily terminates the subsequent processing.

In the above-discussed computing routine, it is determined if the current learning value KGX should be used as it is in accordance with the occasional value of the coolant temperature THW. In addition, the reflective learning value tKG is determined in accordance with the determination result, and the fuel injection amount TAU is then determined based on the learning value tKG. In other words, the learning value KGX is used directly as the reflective learning value tKG when the engine 1 is fully warmed up. When the engine. 1 is in the cold stage, it is considered necessary to compensate the learning value KGX to a smaller value, and the compensated value is used as the reflective learning value tKG in the computation of the fuel injection amount TAU.

Then, the ECU 50 controls the injectors 21 based on the fuel injection amount TAU, computed in the computing routine, to execute the fuel injection amount control.

As has been specifically discussed above, according to this embodiment, the VVT 30 is controlled and the fuel injection amount control is executed based on the running conditions of the engine 1, which include the manifold pressure PM. In this case, when the coolant temperature THW is low and the learning value KGX has not been renewed yet, the previously updated learning value KGX is compensated to become smaller. When the engine 1 is currently in the cold state and the actual cam angle VT is not shifted in the advance angle direction, the reflective learning value tKG is computed in consideration of the conditions, and the fuel injection amount control is carried out based on the reflective learning value tKG. When the engine 1 is cold, therefore, it is possible to positively prevent the occurrence of a difference between the air-fuel ratio to be controlled and the target value. Consequently, the control precision can be improved.

In this embodiment, the learning value KGX is compensated on the basis of the ratio of the real valve characteristic (actual cam angle VT) to the valve characteristic (basic timing VTTB) for the engine 1 in the full warmed-up state.

Figure 11:
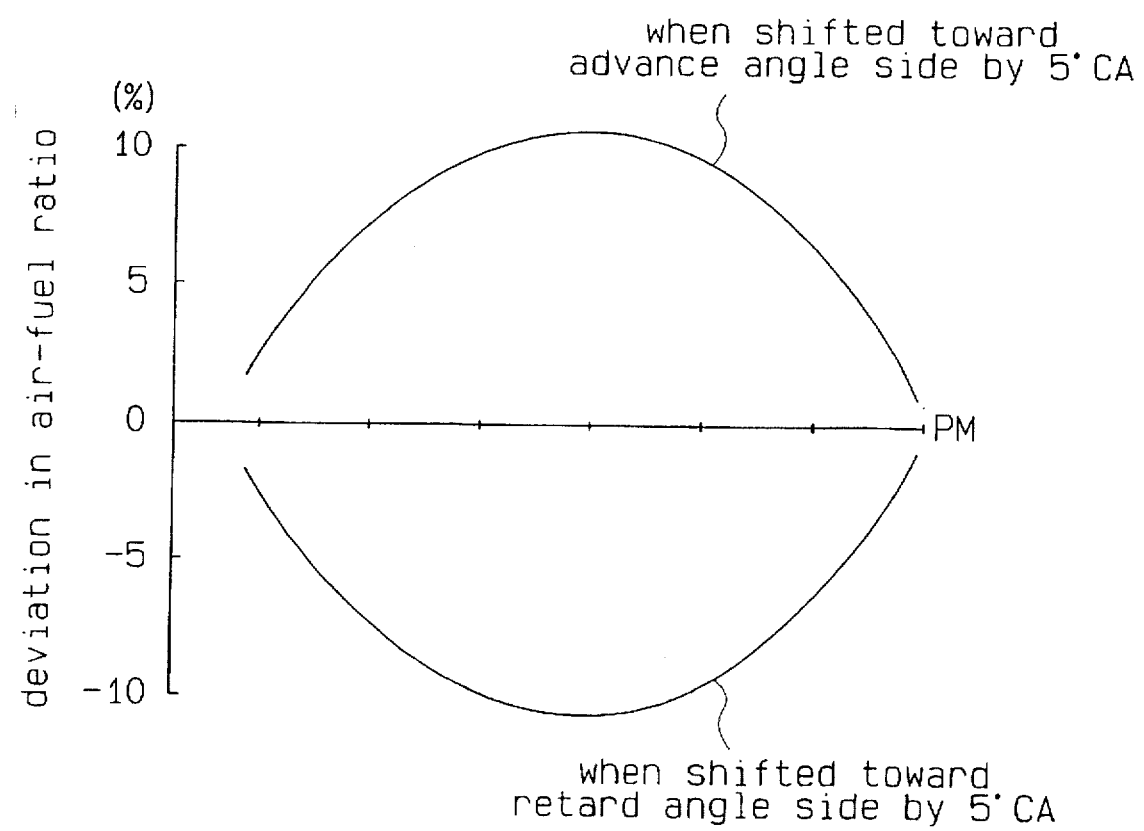
FIG. 11 is a graph showing the deviation of the air-fuel ratio with respect to the manifold pressure when the valve timing is shifted to the advance angle side and the retard angle side.

It is understood from FIG. 11 that a deviation in the valve characteristic (shifting of the valve timing in the advance angle direction and the retard angle direction by, for example, 5° CA in FIG. 11) greatly affects the deviation in the air-fuel ratio, particularly in the intermediate load range. According to this embodiment, by way of comparison, the deviation of the valve characteristic that can significantly affect the deviation of the air-fuel ratio is compensated in direct consideration of such a factor. It is therefore possible to further improve the control precision for the fuel injection amount.

Figure 9:
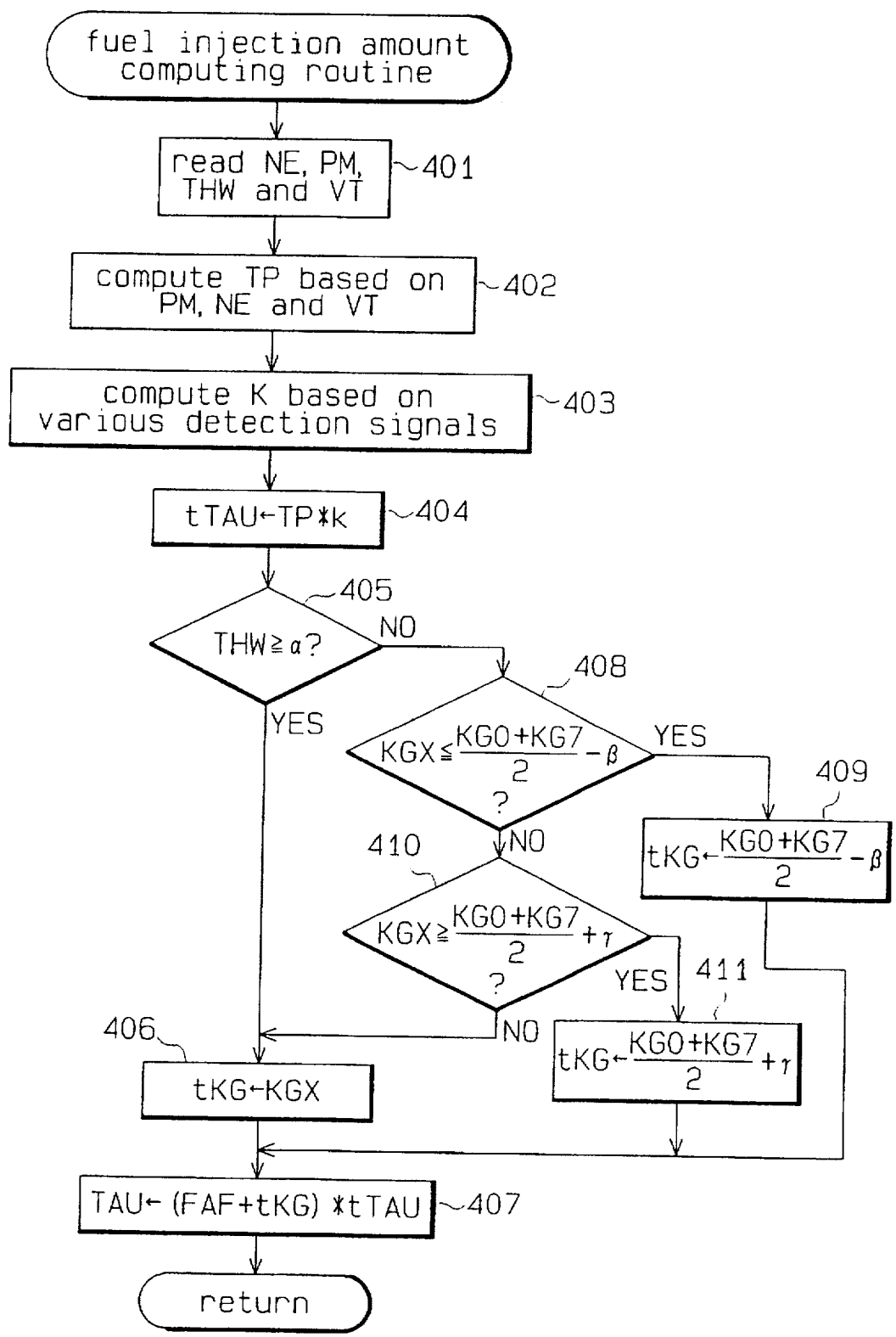
FIG. 9 is a flowchart illustrating a fuel injection amount computing routine according to the second embodiment of this invention.
Figure 10:
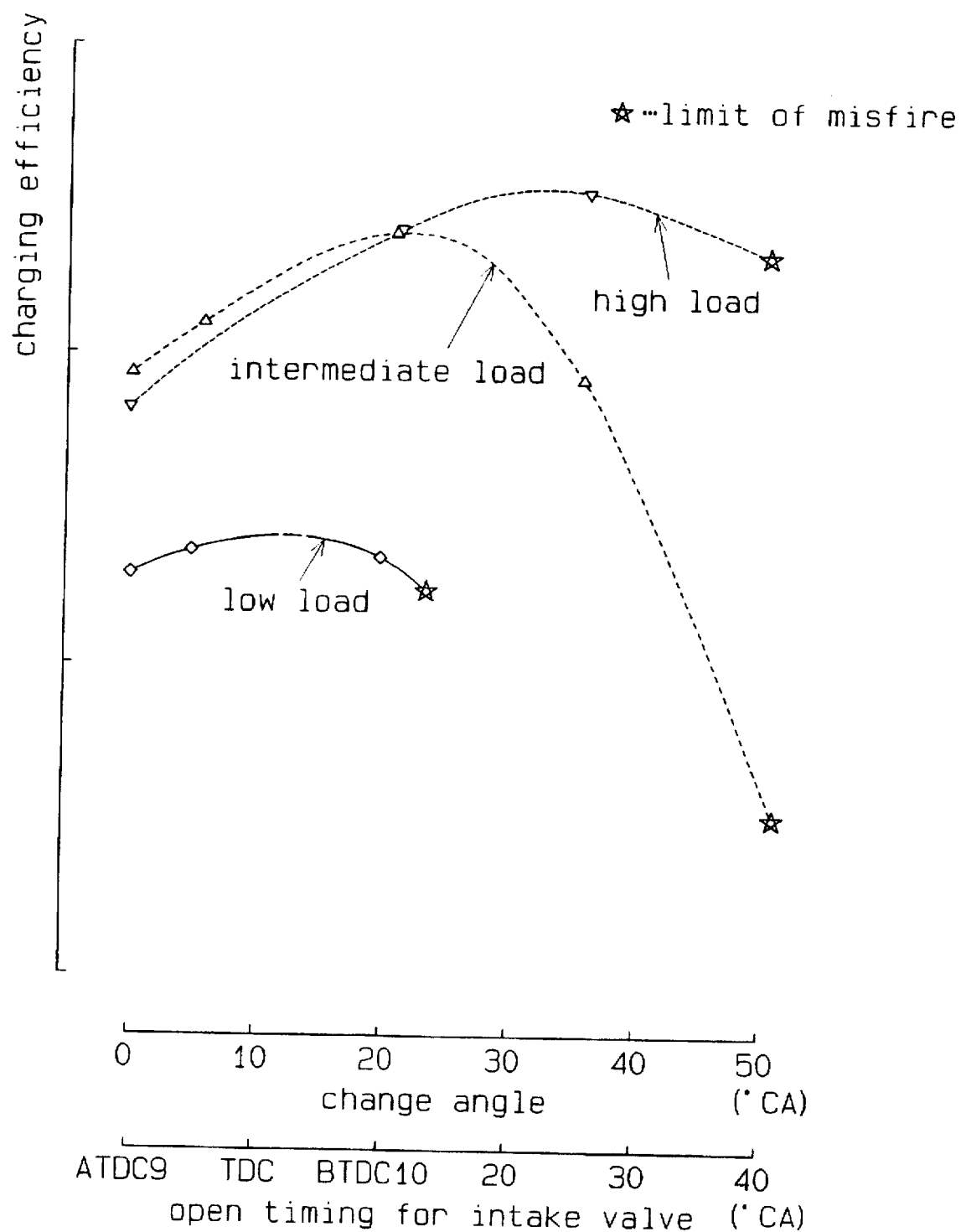
FIG. 10 is a graph showing a deviation in the change angle of the valve timing and a change in the charging efficiency according to the engine load.

The second embodiment of this invention will be now described with reference to FIGS. 9 through 11. The constitution of the second embodiment is substantially the same as that of the first embodiment, so that same reference numerals are given to those components that are the same as the corresponding components of the first embodiment in order to avoid a redundant description. The differences between this embodiment and the first embodiment will be explained below.

This embodiment differs from the first embodiment in the manner of compensating the learning value KGX in the "fuel injection amount computing routine". FIG. 9 presents a flowchart illustrating a "fuel injection amount computing routine" in this embodiment. The ECU 50 periodically executes this routine at predetermined times.

When the process enters this routine, the ECU 50 executes steps 401 to 404 as per the first embodiment (steps 301 to 304). That is, the ECU 50 reads various signals (step 401), computes the basic injection amount TP (step 402), computes the compensation coefficient k (step 403) and sets the result of multiplying the basic injection amount TP by the compensation coefficient k as the injection amount tTAU at the time before the reflection of the learning value (step 404).

In step 405, the ECU 50 determines if the currently read coolant temperature THW is equal to or greater than a predetermined value α. When the coolant temperature THW is equal to or greater than the predetermined value α, the ECU 50 determines that the engine 1 is currently in the full warmed-up state and the renewal of the learning value KGX is in progress, and proceeds to step 406.

In step 406, the ECU 50 sets the learning value KGX, currently renewed in the above-described "learning value renewing routine", directly as the reflective learning value tKG.

In step 407, the ECU 50 computes the target fuel injection amount TAU using the currently set reflective learning value tKG. More specifically, the ECU 50 adds the currently computed reflective learning value tKG to the feedback compensation coefficient FAF computed in another routine, multiplies the currently computed injection amount tTAU by the addition result and sets the multiplication result as the target fuel injection amount TAU. After completing the process in step 407, the ECU 50 temporarily terminates the subsequent processing.

When the coolant temperature THW is less than the predetermined value α in step 405, the ECU 50 determines that the engine 1 is currently in the cold state and no renewal of the learning value KGX is in progress and proceeds to step 408. In step 408, the ECU 50 determines if the current learning value KGX is equal to or smaller than a value obtained by subtracting a predetermined value β from the average value of the learning value KG0 in the minimum load condition and the learning value KG7 in the maximum load condition. The learning value KG0 in the minimum load condition and the learning value KG7 in the maximum load condition are set such that their influence on the charging efficiency caused by the deviation in change angle of the valve timing and thus the air-fuel ratio are relatively small, as shown in FIGS. 10 and 11. In this embodiment, the average value of the learning value KG0 in the minimum load condition and the learning value KG7 in the maximum load condition serve as reference values in determining if the learning value KGX should be compensated. When the decision in step 408 is affirmative, the ECU 50 determines that there is a high probability of increasing the influence of the deviation of the change angle of the valve timing on the air-fuel ratio and proceeds to step 409.

In step 409, the ECU 50 sets the value, obtained by subtracting the predetermined value β from the average value of the learning value KG0 in the minimum load condition and the learning value KG7 in the maximum load condition, as the reflective learning value tKG in order to suppress the influence on the air-fuel ratio. Thus, the computed reflective learning value tKG is what has been so compensated as not to affect the air-fuel ratio compared to the case where it does in the full warmed-up state of the engine 1. Then, the ECU 50 executes the process in step 407 after which the ECU 50 temporarily terminates the subsequent processing.

When the decision in step 408 is negative, on the other hand, the ECU 50 proceeds to step 410. In this step 410, the ECU 50 determines if the current learning value KGX is equal to or greater than the value, obtained by adding a predetermined value γ to the average value of the learning value KG0 in the minimum load condition and the learning value KG7 in the maximum load condition. When the decision is affirmative, the ECU 50 determines that there is a high probability of increasing the influence of the deviation of the change angle of the valve timing on the air-fuel ratio and proceeds to step 411. In step 411, the ECU 50 sets the value, obtained by adding the predetermined value γ to the average value of the learning value KG0 in the minimum load condition and the learning value KG7 in the maximum load condition, as the reflective learning value tKG in order to suppress the influence on the air-fuel ratio. Therefore, the computed reflective learning value tKG is what has been so compensated as not to affect the air-fuel ratio compared to the case where it does in the full warmed-up state of the engine 1. Then, the ECU 50 executes the process in step 407, after which the ECU 50 temporarily terminates the subsequent processing.

When the decision in step 410 is negative, the ECU 50 determines that the deviation of the change angle of the valve timing hardly affects the air-fuel ratio, and moves to step 406. Then, the ECU 50 executes steps 406 and 407 and temporarily terminates the subsequent processing.

In the above-described computing routine, it is determined in accordance with the occasional coolant temperature THW whether or not the current learning value KGX should be used directly. In addition, it is determined if the current learning value KGX is such that the deviation of the change angle of the valve timing may affect the air-fuel ratio, when the coolant temperature THW is less than the predetermined temperature α. The reflective learning value tKG is determined in accordance with the determination result, and the fuel injection amount TAU is determined based on the reflective learning value tKG, etc. In other words, the learning value KGX is directly used as the reflective learning value tKG in the computation of the fuel injection amount TAU when the engine 1 is fully warmed up. When the engine 1 is cold, the learning value KGX should be compensated to a smaller value, which is in turn used as the reflective learning value tKG in computing the fuel injection amount TAU.

Based on the fuel injection amount TAU computed in this routine, the ECU 50 then controls the injectors 21 to execute the fuel injection amount control.

As has been described in detail above, like the first embodiment, the second embodiment can positively prevent the occurrence of a deviation in the air-fuel ratio to be controlled when the engine 1 is in the cold state. It is therefore possible to improve the control precision for the fuel injection amount.

In compensating the learning value KGX, in particular, a decision on whether the learning value KGX should be compensated is based on the average value of the learning value KG0 in the minimum load condition and the learning value KG7 in the maximum load condition in this embodiment. The learning value KG0 in the minimum load condition and the learning value KG7 in the maximum load condition are such that their influences on the charging efficiency caused by the deviation in change angle of the valve timing and thus the air-fuel ratio are relatively small (see FIGS. 10 and 11). It is therefore possible to further improve the control precision for the fuel injection amount.

Although only two embodiments of the present invention have been described herein, it should be apparent to those skilled in the art that the present invention may be embodied in many other specific forms without departing from the spirit or scope of the invention. Particularly, it should be understood that this invention may be embodied in the following forms.

In the first embodiment, the learning value KGX is compensated based on the ratio of the real valve characteristic (actual cam angle VT) to the valve characteristic for the engine 1 in the full warmed-up state (basic timing VTTB). If the parameter is such that the air-fuel ratio is influenced depending on the running conditions of the engine 1, the compensation may be performed based on, for example, the coolant temperature THW, the air temperature or the like.

In the above-described embodiments, this invention is adapted for use for the engine 1 which is equipped with the VVT 30 that can alter the valve timing associated with the intake valves 12. The VVT 30 may be designed to be able to alter the open/close timing of the exhaust valves 13. The structure of the VVT 30 is in no way limited to the structures of those of the above-described embodiments.

In the above-described embodiments, the basic injection amount TP is computed based on the manifold pressure PM, the engine speed NE, etc. The basic injection amount TP may be computed based on parameters including at least the result of the direct detection of the amount of the introduced air.

Therefore, the present examples and embodiments are to be considered as illustrative and not restrictive and the invention is not to be limited to the details given herein, but may be modified within the scope of the appended claims.

What is claimed is:

1. A fuel injection amount control apparatus for an engine having a fuel injecting means for injecting fuel supplied to a combustion chamber, an air intake passage for introducing air to the combustion chamber, an exhaust passage for exhausting gas from the combustion chamber, an intake valve for selectively opening and closing the air intake passage, an exhaust valve for selectively opening and closing the exhaust passage and a valve adjusting means for adjusting an actuating characteristic of at least one of the intake valve and the exhaust valve, wherein said adjusting means is controlled by a first control means, and wherein said apparatus has a detecting means for detecting a running condition of the engine, a computing means for computing a target value representing the fuel injection amount injected by the fuel injecting means based on the detected running condition, a second control means for controlling the fuel injecting means based on the computed target value, learning means for learning a value representing an air-fuel ratio of a combustible fuel mixture based on the adjusted actuating characteristic and the detected running condition, a reflecting means for reflecting the learning value in computing the target fuel injection amount, a renewing means for renewing the learning value when the detected running condition is in a specific condition, and wherein the first control means controls the adjusting means based on the detected running condition, said apparatus including:

compensating means for compensating the reflected learning value when the detected running condition is out of said specific condition.

2. The apparatus as set forth in claim 1, wherein said actuating characteristic is a valve timing, said valve timing being adjustable between two limits, and wherein said first control means controls the adjusting means to advance or retard the valve timing of the intake valve.

3. The apparatus as set forth in claim 2 further comprising crank shaft for transmitting power of the engine, wherein first adjusting means includes:

a cam shaft rotatable in association with the crank shaft for actuating at least one of the intake valve and the exhaust valve;

a timing pulley provided on said cam shaft for transmitting torque from the crank shaft to the cam shaft;

a ring gear for coupling the cam shaft to the timing pulley to cause a rotational phase difference between the cam shaft and the timing pulley based on movement of the ring gear in an axial direction thereof; and wherein said ring gear is positioned by hydraulic pressure.

4. The apparatus as set forth in claim 3, wherein said detecting means includes:

a first sensor for detecting the rotation speed of the crank shaft;

a second sensor for detecting the pressure in said air intake passage; and a third sensor for detecting the temperature of said engine.

5. The apparatus as set forth in claim 4, wherein said specific condition includes that said detected temperature of the engine is equal to or greater than a predetermined value.

6. The apparatus as set forth in claim 5, wherein said computing means computes said target value based on said detected rotation speed of the crank shaft and said detected pressure in the intake passage.

7. The apparatus as set forth in claim 6, wherein said first control means, said second control means, said computing means, said learning means, said reflecting means, said renewing means and said compensating means are included in an electronic control unit having an input signal circuit, a memory, an operation circuit and an output signal circuit.

8. The apparatus as set forth in claim 1, wherein said compensating means compensates said learning value based on a ratio of a current actuating characteristic of the valves to an actuating characteristic in which the detected running condition satisfies the specific condition.

9. The apparatus as set forth in claim 8, wherein said actuating characteristic is a valve timing, and wherein said valve timing is adjustable between two limits, and wherein said first control means controls the adjusting means to advance or retard the valve timing of the intake valve.

10. The apparatus as set forth in claim 9 further comprising crank shaft for transmitting power of the engine, wherein first adjusting means includes:

a cam shaft rotatable in association with the crank shaft for actuating at least one of the intake valve and the exhaust valve;

a timing pulley provided on said cam shaft for transmitting torque from the crank shaft to the cam shaft;

a ring gear for coupling the cam shaft to the timing pulley to cause a rotational phase difference between the cam shaft and the timing pulley based on movement of the ring gear in an axial direction thereof; and wherein said ring gear is positioned by hydraulic pressure.

11. The apparatus as set forth in claim 10, wherein said detecting means includes:

a first sensor for detecting the rotation speed of the crank shaft;

a second sensor for detecting the pressure in said air intake passage; and a third sensor for detecting the temperature of said engine.

12. The apparatus as set forth in claim 11, wherein said specific condition includes that said detected temperature of the engine is equal to or greater than a predetermined value.

13. The apparatus as set forth in claim 12, wherein said computing means computes said target value based on said detected rotation speed of the crank shaft and said detected pressure in the intake passage.

14. The apparatus as set forth in claim 13, wherein said first control means, said second control means, said computing means, said learning means, said reflecting means, said renewing means and said compensating means are included in an electronic control unit having an input signal circuit, a memory, an operation circuit and an output signal circuit.

15. The apparatus as set forth in claim 1, wherein said learning means divides the detected running condition into a plurality of sub ranges, each sub ranges corresponding to a predetermined learning value, wherein said compensating means compensates the learning value based on the learning value of a specific sub range where the effect on the air-fuel ratio by the actuating characteristic is relatively small.

16. The apparatus as set forth in claim 15, wherein said actuating characteristic is a valve timing, and wherein said valve timing is adjustable between two limits, and wherein said first control means controls the adjusting means to advance or retard the valve timing of the intake valve.

17. The apparatus as set forth in claim 16 further comprising crank shaft for transmitting power of the engine, wherein first adjusting means includes:

a cam shaft rotatable in association with the crank shaft for actuating at least one of the intake valve and the exhaust valve;

a timing pulley provided on said cam shaft for transmitting torque from the crank shaft to the cam shaft;

a ring gear for coupling the cam shaft to the timing pulley to cause a rotational phase difference between the cam shaft and the timing pulley based on movement of the ring gear in an axial direction thereof; and wherein said ring gear is positioned by hydraulic pressure.

18. The apparatus as set forth in claim 17, wherein said detecting means includes:

a first sensor for detecting the rotation speed of the crank shaft;

a second sensor for detecting the pressure in said air intake passage; and a third sensor for detecting the temperature of said engine.

19. The apparatus as set forth in claim 18, wherein said specific condition includes that said detected temperature of the engine is equal to or greater than a predetermined value.

20. The apparatus as set forth in claim 19, wherein said computing means computes said target value based on said detected rotation speed of the crank shaft and said detected pressure in the intake passage.

21. The apparatus as set forth in claim 20, wherein said first control means, said second control means, said computing means, said learning means, said reflecting means, said renewing means and said compensating means are included in an electronic control unit having an input signal circuit, a memory, an operation circuit and an output signal circuit.

* * * * *